(12) United States Patent
Wu

(10) Patent No.: US 10,154,434 B2
(45) Date of Patent: Dec. 11, 2018

(54) CHANNEL RESERVATION METHOD AND COMMUNICATIONS DEVICE

(71) Applicant: Huawei Technologies Co., Ltd., Shenzhen (CN)

(72) Inventor: Tianyu Wu, Shenzhen (CN)

(73) Assignee: Huawei Technologies Co., Ltd, Shenzhen (CN)

(*) Notice: Subject to any disclaimer, the term of this patent is extended or adjusted under 35 U.S.C. 154(b) by 91 days.

(21) Appl. No.: 15/211,622

(22) Filed: Jul. 15, 2016

(65) Prior Publication Data

US 2016/0323776 A1    Nov. 3, 2016

Related U.S. Application Data

(63) Continuation of application No. PCT/CN2014/070705, filed on Jan. 16, 2014.

(51) Int. Cl.
*H04W 4/00* (2018.01)
*H04W 28/04* (2009.01)
(Continued)

(52) U.S. Cl.
CPC ......... *H04W 28/044* (2013.01); *H04L 49/201* (2013.01); *H04W 28/26* (2013.01);
(Continued)

(58) Field of Classification Search
CPC ...... H04W 72/04; H04W 88/08; H04W 76/00
See application file for complete search history.

(56) References Cited

U.S. PATENT DOCUMENTS

| 8,400,960 B2 | 3/2013 | Hiertz et al. |
| 2003/0210672 A1* | 11/2003 | Cromer ................... H04L 47/10 370/338 |

(Continued)

FOREIGN PATENT DOCUMENTS

| CN | 1951068 A | 4/2007 |
| CN | 101326765 A | 12/2008 |

(Continued)

OTHER PUBLICATIONS

Kraemner, Bruce, "Creation of New IEEE 802.11 High efficiency WLAN Study Group," IEEE, 802.11-413/0418r2, May 2013, 4 pages.

*Primary Examiner* — Siren Wei
(74) *Attorney, Agent, or Firm* — Slater Matsil, LLP

(57) ABSTRACT

The present invention discloses a channel reservation method and a communications device. The method includes: generating, by a first device, a first indication frame, where the first indication frame is used for indicating a moment at which a second device sends a channel reservation frame, and the channel reservation frame is used for reserving a channel to be used when the first device sends data to the second device; and sending, by the first device, the first indication frame to multiple second devices. In the channel reservation method, a sender device in a data transmission process indicates a moment at which a receiver device sends a channel reservation frame, so that multiple receiver devices in the data transmission process send channel reservation frames at the same time, which avoids contention between the receiver devices in current data transmission, thereby reducing a collision probability, and reducing system overheads.

14 Claims, 7 Drawing Sheets

(51) Int. Cl.
  *H04W 74/08* (2009.01)
  *H04L 12/931* (2013.01)
  *H04W 28/26* (2009.01)
  *H04W 72/04* (2009.01)
  *H04W 84/12* (2009.01)

(52) U.S. Cl.
  CPC ....... *H04W 72/0453* (2013.01); *H04W 74/08* (2013.01); *H04W 74/085* (2013.01); *H04W 84/12* (2013.01)

(56) References Cited

U.S. PATENT DOCUMENTS

| | | | |
|---|---|---|---|
| 2007/0124443 A1 | 5/2007 | Nanda et al. | |
| 2008/0063106 A1* | 3/2008 | Hahm | H04L 1/0003 375/267 |
| 2009/0279524 A1* | 11/2009 | Yu | H04W 74/0833 370/338 |
| 2011/0069628 A1* | 3/2011 | Liu | H04W 74/0816 370/252 |
| 2011/0176627 A1* | 7/2011 | Wu | H04B 7/0452 375/260 |
| 2012/0076073 A1* | 3/2012 | Merlin | H04W 74/0816 370/328 |
| 2016/0277166 A1 | 9/2016 | Liu | |
| 2016/0323776 A1 | 11/2016 | Wu | |
| 2016/0330631 A1 | 11/2016 | Wu | |
| 2016/0338085 A1 | 11/2016 | Wu | |
| 2016/0338105 A1 | 11/2016 | Wu et al. | |

FOREIGN PATENT DOCUMENTS

| | | |
|---|---|---|
| CN | 102300257 A | 12/2011 |
| CN | 102523608 A | 6/2012 |
| CN | 102893534 A | 1/2013 |
| CN | 103313421 A | 9/2013 |
| CN | 103327640 A | 9/2013 |

* cited by examiner

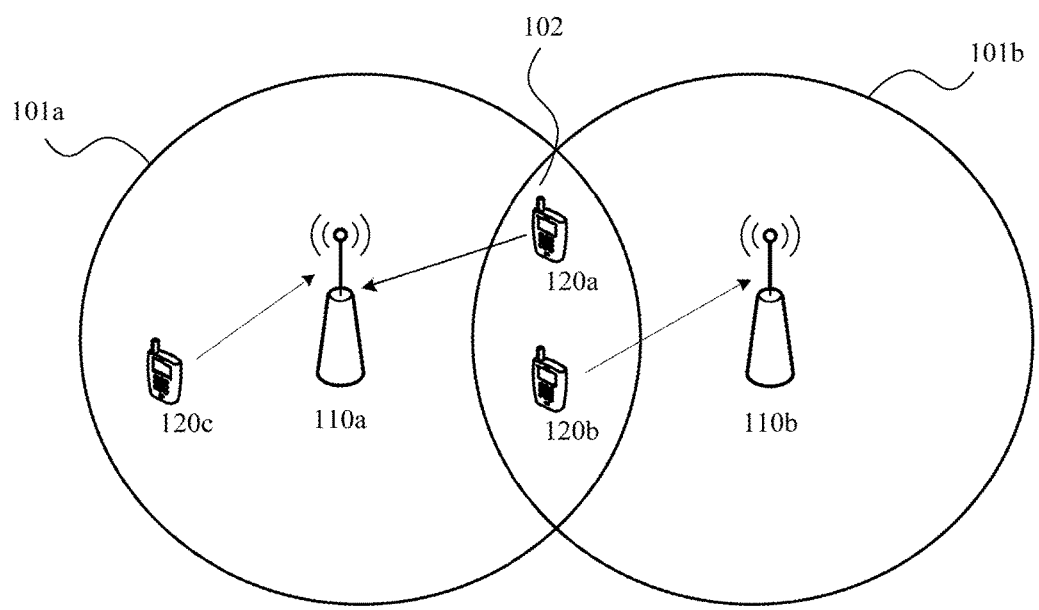

FIG. 1

| 20 |
|---|
| A first device generates a first indication frame, where the first indication frame is used for indicating a moment at which a second device sends a channel reservation frame, and the channel reservation frame is used for reserving a channel to be used when the first device sends data to the second device — 201 |
| The first device sends the first indication frame to multiple second devices — 202 |

| 301: A second device receives a first indication frame from a first device, where the first indication frame is used for indicating a sending moment at which the second device sends a channel reservation frame, and the channel reservation frame is used for reserving a channel to be used when the first device sends data to the second device |

↓

| 302: The second device determines the sending moment according to the first indication frame, and sending the channel reservation frame at the sending moment |

| 401: A first device generates a second indication frame, where the second indication frame is used for instructing a second device to send a channel reservation frame, and the channel reservation frame is used for reserving a channel to be used when the first device sends data to the second device |

↓

| 402: The first device sends the second indication frame to the second device |

A second device receives a second indication frame from a first device, where the second indication frame is used for instructing the second device to send a channel reservation frame, and the channel reservation frame is used for reserving a channel to be used when the first device sends data to the second device  ~ 501

The second device sends the channel reservation frame  ~ 502

FIG. 5

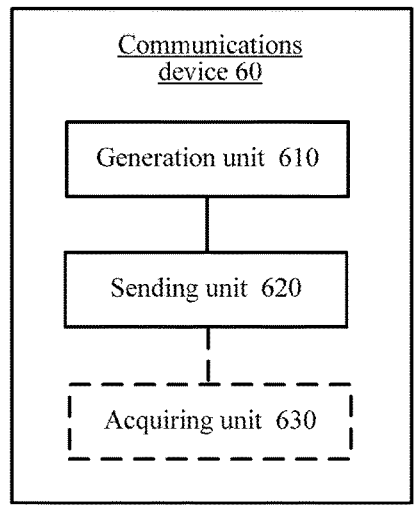

FIG. 6

CHANNEL RESERVATION METHOD AND COMMUNICATIONS DEVICE

CROSS-REFERENCE TO RELATED APPLICATIONS

This application is a continuation of International Patent Application No. PCT/CN2014/070705, filed on Jan. 16, 2014, which is hereby incorporated by reference in its entirety.

TECHNICAL FIELD

The present invention relates to the communications field, and in particular, to a channel reservation method and a communications device.

BACKGROUND

A WLAN (Wireless Local Area Network) system works on an unlicensed spectrum; therefore, other users may share the spectrum on a channel. If multiple users send data at the same time, the data may interfere with each other, causing a collision. The WLAN system uses a CSMA/CA (Carrier Sense Multiple Access with Collision Avoidance) mode to avoid a collision. Carrier sense CS refers to that any device connected to the channel first senses the channel before preparing to send data. The data may be sent only when it is confirmed that the channel is idle. Multiple access MA refers to that multiple devices may access a channel at the same time, and a data frame sent by one device may be received by multiple devices. A CSMA/CA mechanism resolves a collision problem by means of active collision avoidance instead of passive detection, which can satisfy those demands for which it is not easy to accurately detect whether a collision occurs. A working manner of CSMA is: when a device prepares to send a data frame and senses that a channel is idle, if the device further waits for a random time in which the channel is still idle, the device sends the data frame. However, there is a problem about a hidden node in a WLAN network; and when an access point AP1 sends data to a STA (Station), a station or an access point that cannot sense the access point AP1 may think that the channel is idle and send the data, which interferes with the receiving device STA. Such a problem about a hidden node cannot be resolved by using a CSMA/CA protocol.

At present, for the problem about a hidden node, the WLAN system protects transmission by using an RTS/CTS (Request to Send/Clear to Send) protocol, where a channel is reserved before a station or an access point sends data. The RTS/CTS protocol specifies: the access point AP1 first sends an RTS frame before sending the data, and the STA responds with a CTS frame after receiving the RTS frame. Each of other APs (Access Point) or STAs that receive the RTS or CTS frame sets a NAV (Network Allocation Vector) according to an indication of the received RTS or CTS frame. Within a time corresponding to the NAV, such AP or STA cannot send data on the corresponding channel. After sending the RTS frame and receiving the CTS frame returned by the STA, the AP1 obtains a sending opportunity, and if the AP1 sends data to the STA within this time period, the AP1 is not interfered by a surrounding AP or STA.

However, when APs and STAs are intensively deployed in the WLAN system, a collision probability of RTS frames greatly increases, and a contention window length after a collision doubles; therefore, not only system overheads are relatively high, but also a reduction in system efficiency is caused.

SUMMARY

The present invention provides a channel reservation method and a communications device, which can reduce a collision probability, thereby reducing system overheads.

According to a first aspect, the present invention provides a channel reservation method, including: generating, by a first device, a first indication frame, where the first indication frame is used for indicating a moment at which a second device sends a channel reservation frame, and the channel reservation frame is used for reserving a channel to be used when the first device sends data to the second device; and sending, by the first device, the first indication frame to multiple second devices.

With reference to the first aspect, in a first implementation manner of the first aspect, the sending, by the first device, the first indication frame to multiple second devices includes: sending, by the first device, the first indication frame to the multiple second devices in a broadcast or multicast manner.

With reference to the first aspect and the foregoing implementation manner thereof, in a second implementation manner of the first aspect, before the generating, by a first device, a first indication frame, the method further includes: acquiring, by the first device, scheduling information; and the sending, by the first device, the first indication frame to multiple second devices includes: sending, by the first device, the first indication frame to the multiple second devices according to the scheduling information.

According to a second aspect, the present invention provides a channel reservation method, including: receiving, by a second device, a first indication frame from a first device, where the first indication frame is used for indicating a sending moment at which the second device sends a channel reservation frame, and the channel reservation frame is used for reserving a channel to be used when the first device sends data to the second device; and determining, by the second device, the sending moment according to the first indication frame, and sending the channel reservation frame at the sending moment.

With reference to the second aspect, in a first implementation manner of the second aspect, the first indication frame includes a random backoff time, and the determining, by the second device, the sending moment according to the first indication frame includes: performing, by the second device, random backoff according to the random backoff time in the first indication frame; and if the channel is idle within the random backoff time, determining, by the second device, that a moment at which the random backoff time expires is the sending moment.

With reference to the second aspect and the foregoing implementation manner thereof, in a second implementation manner of the second aspect, the first indication frame includes a channel reservation frame sending rule, and the determining, by the second device, the sending moment according to the first indication frame includes: determining, by the second device, the sending moment according to the channel reservation frame sending rule in the first indication frame.

With reference to the second aspect and the foregoing implementation manners thereof, in a third implementation manner of the second aspect, the sending the channel reservation frame at the sending moment includes: sending the channel reservation frame at the sending moment in a broadcast manner.

According to a third aspect, the present invention provides a channel reservation method, including: generating, by a first device, a second indication frame, where the second indication frame is used for instructing a second device to send a channel reservation frame, and the channel reservation frame is used for reserving a channel to be used when the first device sends data to the second device; and sending, by the first device, the second indication frame to the second device.

With reference to the third aspect, in a first implementation manner of the third aspect, the sending, by the first device, the second indication frame to the second device includes: performing, by the first device, random backoff; and sending, by the first device, the second indication frame to the second device when the channel is idle.

According to a fourth aspect, the present invention provides a channel reservation method, including: receiving, by a second device, a second indication frame from a first device, where the second indication frame is used for instructing the second device to send a channel reservation frame, and the channel reservation frame is used for reserving a channel to be used when the first device sends data to the second device; and sending, by the second device, the channel reservation frame.

With reference to the fourth aspect, in a first implementation manner of the fourth aspect, the sending, by the second device, the channel reservation frame includes: performing, by the second device, random backoff; and if the channel is idle, sending, by the second device, the channel reservation frame.

According to a fifth aspect, the present invention provides a communications device, including: a generation unit, configured to generate a first indication frame, where the first indication frame is used for indicating a moment at which a second device sends a channel reservation frame, and the channel reservation frame is used for reserving a channel to be used when the communications device sends data to the second device; and a sending unit, configured to send the first indication frame to multiple second devices.

With reference to the fifth aspect, in a first implementation manner of the fifth aspect, the sending unit is specifically configured to send the first indication frame to the multiple second devices in a broadcast or multicast manner.

With reference to the fifth aspect and the foregoing implementation manner thereof, in a second implementation manner of the fifth aspect, the communications device further includes: an acquiring unit, configured to acquire scheduling information, where the sending unit is specifically configured to send the first indication frame to the multiple second devices according to the scheduling information.

According to a sixth aspect, the present invention provides a communications device, including: a receiving unit, configured to receive a first indication frame from a first device, where the first indication frame is used for indicating a sending moment at which the communications device sends a channel reservation frame, and the channel reservation frame is used for reserving a channel to be used when the first device sends data to the communications device; a determining unit, configured to determine the sending moment according to the first indication frame; and a sending unit, configured to send the channel reservation frame at the sending moment.

With reference to the sixth aspect, in a first implementation manner of the sixth aspect, the first indication frame includes a random backoff time, and the communications device further includes: a control unit, configured to control, according to the random backoff time in the first indication frame, the communications device to perform random backoff, where the determining unit is specifically configured to: if the channel is idle within the random backoff time, determine that a moment at which the random backoff time expires is the sending moment.

With reference to the sixth aspect and the foregoing implementation manner thereof, in a second implementation manner of the sixth aspect, the first indication frame includes a channel reservation frame sending rule, and the determining unit is specifically configured to determine the sending moment according to the channel reservation frame sending rule in the first indication frame.

With reference to the sixth aspect and the foregoing implementation manners thereof, in a third implementation manner of the sixth aspect, the sending unit is specifically configured to send the channel reservation frame at the sending moment in a broadcast manner.

According to a seventh aspect, the present invention provides a communications device, including: a generation unit, configured to generate a second indication frame, where the second indication frame is used for instructing a second device to send a channel reservation frame, and the channel reservation frame is used for reserving a channel to be used when the communications device sends data to the second device; and a sending unit, configured to send the second indication frame to the second device.

With reference to the seventh aspect, in a first implementation manner of the seventh aspect, the communications device further includes: a control unit, configured to control the communications device to perform random backoff, where the sending unit is specifically configured to send the second indication frame to the second device when the channel is idle.

According to an eighth aspect, the present invention provides a communications device, including: a receiving unit, configured to receive a second indication frame from a first device, where the second indication frame is used for instructing the communications device to send a channel reservation frame, and the channel reservation frame is used for reserving a channel to be used when the first device sends data to the communications device; and a sending unit, configured to send the channel reservation frame.

With reference to the eighth aspect, in a first implementation manner of the eighth aspect, the communications device further includes: a control unit, configured to control the communications device to perform random backoff, where the sending unit is specifically configured to: if the channel is idle, send the channel reservation frame.

Based on the foregoing technical solutions, in the channel reservation method of the present invention, a sender device in a data transmission process indicates a moment at which a receiver device sends a channel reservation frame, so that multiple receiver devices in the data transmission process send channel reservation frames at the same time, which avoids contention between the receiver devices in current data transmission, thereby reducing a collision probability, and reducing system overheads.

BRIEF DESCRIPTION OF THE DRAWINGS

To describe the technical solutions in the embodiments of the present invention more clearly, the following briefly introduces the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

FIG. 1 is a schematic structural diagram of an applicable communications system according to an embodiment of the present invention;

FIG. 2 is a schematic flowchart of a channel reservation method according to an embodiment of the present invention;

FIG. 3 is a schematic flowchart of a channel reservation method according to another embodiment of the present invention;

FIG. 4 is a schematic flowchart of a channel reservation method according to another embodiment of the present invention;

FIG. 5 is a schematic flowchart of a channel reservation method according to another embodiment of the present invention;

FIG. 6 is a schematic block diagram of a communications device according to an embodiment of the present invention;

DETAILED DESCRIPTION OF ILLUSTRATIVE EMBODIMENTS

Figure 7:
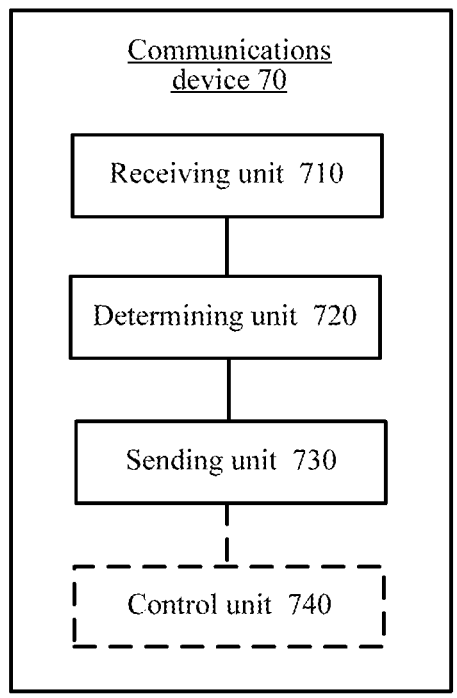
FIG. 7 is a schematic block diagram of a communications device according to another embodiment of the present invention.

The following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

It should be understood that, the technical solutions in the embodiments of the present invention may be applied to a communications system using an unlicensed spectrum resource, for example, a WALN system.

It should be further understood that, in the embodiments of the present invention, an access point is a network device providing an access service, for example, an AP in a WALN system. A station is a device on the other end that accesses the access point by using a wireless network to perform communication, for example, user equipment ("UE" for short), which may be referred to as a terminal, a mobile station ("MS" for short), a mobile terminal, or the like, which is not limited in the present invention. However, for ease of description, the following embodiments are described by using the access point AP and the station STA as examples.

FIG. 1 is a schematic structural diagram of an applicable communications system according to an embodiment of the present invention. The communications system in FIG. 1 is described by using a first AP 110a whose coverage area is 101a and a second AP 110b whose coverage area is 101b as examples. However, a quantity of APs 110 is not limited in this embodiment of the present invention.

A first STA 120a accesses the first AP 110a, a second STA 120b accesses the second AP 110b, a third STA 120c accesses the first AP 110a, and the first STA 120a and the second STA 120b are located in a coverage area 102 in which 101a overlaps 101b.

If transmission protection is performed by using an RTS/CTS protocol, when preparing to send data to the first STA 120a and the third STA 120c, the AP 110a may first send an RTS frame. After receiving the RTS frame, the first STA 120a and the third STA 120c respond with a CTS frame. After receiving the RTS or the CTS frame, each of the second AP 110b and the second STA 120b sets a NAV, and does not send data on a corresponding channel within a time corresponding to the NAV. After receiving the CTS frame, the first AP 110a obtains a sending opportunity, and sends data to the first STA 120a and the third STA 120c. In this case, the first STA 120a and the third STA 120c are not interfered by a surrounding AP or STA. In this way, transmission protection is performed by using the RTS/CTS protocol, and therefore, relatively high additional overheads are caused. Alternatively, the first AP 110a sends a CTS-to-self (Clear to send to self) frame and directly sends data, without needing the first STA 120a and the third STA 120c to make a response. In this way, additional overheads are reduced, but a problem about a hidden node cannot be resolved.

In addition, when APs and STAs are intensively deployed in a WLAN system, a collision probability of RTS frames greatly increases, and a contention window length after a collision doubles; therefore, not only system overheads are relatively high, but also a reduction in system efficiency is caused.

An embodiment of the present invention provides a channel reservation method, which not only can resolve a problem about a hidden node, but also reduces additional system overheads, and can be applied to multiple application scenarios that are based on contention or into which a scheduling mode is introduced.

FIG. 2 is a schematic flowchart of a channel reservation method 20 according to an embodiment of the present invention. A first device executing the method 20 of FIG. 2 is a sender in a data transmission process, for example, an AP 110 shown in FIG. 1.

201: The first device generates a first indication frame, where the first indication frame is used for indicating a moment at which a second device sends a channel reservation frame, and the channel reservation frame is used for reserving a channel to be used when the first device sends data to the second device.

For example, if the second device sends a channel reservation frame to reserve a channel to be used when the first device sends data to the second device, the channel reservation frame is used for informing the first device that the channel may be used to send the data to the second device within a time period specified by the channel reservation frame.

In addition, in addition to the first device, there are also some devices that can sense the channel reservation frame sent by the second device. Therefore, the channel reservation frame may be further used for indicating that all other devices that receive the channel reservation frame except the first device cannot use, within the time period specified by the channel reservation frame, the channel to actively initiate data transmission.

202: The first device sends the first indication frame to multiple second devices.

In the channel reservation method in this embodiment of the present invention, a sender device in a data transmission process indicates a moment at which a receiver device sends a channel reservation frame, so that multiple receiver devices in the data transmission process send channel reservation frames at the same time. In this case, after the sender device receives the channel reservation frame, it is considered that current channel reservation is successful, and a transmission opportunity is obtained. The receiver devices send the channel reservation frame, to contend for a channel, and the sender device does not need to send an additional frame responding to the channel reservation frame, which not only resolves a problem about a hidden node, but also avoids contention between the receiver devices in current data transmission, thereby reducing a collision probability, and reducing system overheads.

In addition, when transmission protection is performed according to the channel reservation method in this embodiment of the present invention, the channel reservation method is not limited by an application scenario, for example, a contention working mode, a scheduling mode, or a mode in which contention and scheduling are integrated. Therefore, this embodiment of the present invention has a wider application scope.

It should be understood that, the first device is the sender in the data transmission process, and the second device is a receiver in the data transmission process. In an application scenario of an unscheduled mode, for example, in a contention mode, the second device may determine that the second device is the receiver in the data transmission process when receiving the first indication frame or by receiving another information frame sent by the first device. Alternatively, in an application scenario into which the scheduling mode is introduced, the second device may determine, after acquiring scheduling information, that the second device is the receiver of the data in a corresponding timeslot on the corresponding channel, so that a receiver in a data transmission process can send a channel reservation frame, thereby resolving a problem about a hidden node.

For example, when multiple BSSs (Basic Service Set) based on the scheduling mode coexist, APs of the multiple BSSs may contend for a channel by using a method of controlling STAs to send channel reservation frames. An AP of each BSS may instruct a scheduled STA to send, on a scheduled channel, a channel reservation frame according to a random backoff time generated by the AP. All STAs on a same channel in a same BSS send channel reservation frames at the same time, and contend with other BSSs for a channel, which not only avoids contention between the STAs in this BSS, but also reduces a collision probability.

For another example, the second devices uniformly send channel reservation frames by means of OFDM (Orthogonal Frequency Division Multiplexing). Physical layer data, physical layer parameters, and encoding manners of the channel reservation frames are completely the same, so as to ensure that the first device can correctly receive the channel reservation frames that are sent by the multiple second devices at the same time, and therefore, obtain a transmission opportunity. Using a CTS-to-self frame as an example, to ensure that CTS-to-self frames sent by all the STAs are identical, structures of the CTS-to-self frames need to be modified, where RA (Receiver Address) domains in the CTS-to-self frames no longer indicate address information of the CTS-to-self frames, but indicate a same address, for example, an address of the AP, or a network address preset by multiple coordinated BSSs.

Optionally, as an embodiment, in step 202, when the first device sends the first indication frame to multiple second devices, the first device may send the first indication frame to the multiple second devices in a broadcast or multicast manner.

Optionally, as another embodiment, before the first device generates the first indication frame, the first device may acquire scheduling information. In this case, when sending the first indication frame to the multiple second devices, the first device may send the first indication frame to the multiple second devices according to the scheduling information.

For example, in a WLAN into which the scheduling mode is introduced, the first device may be an AP, which determines a receiving device for data transmission according to acquired scheduling information, then generates a first indication frame, and sends the first indication frame to the corresponding receiving device (for example, the second device).

FIG. 3 is a schematic flowchart of a channel reservation method 30 according to another embodiment of the present invention. A second device executing the method 30 of FIG. 3 is a receiver in a data transmission process, for example, a STA 120 shown in FIG. 1.

301: The second device receives a first indication frame from a first device, where the first indication frame is used for indicating a sending moment at which the second device sends a channel reservation frame, and the channel reservation frame is used for reserving a channel to be used when the first device sends data to the second device.

For example, if the second device sends a channel reservation frame to reserve a channel to be used when the first device sends data to the second device, the channel reservation frame is used for informing the first device that the channel may be used to send the data to the second device within a time period specified by the channel reservation frame.

In addition, in addition to the first device, there are also some devices that can sense the channel reservation frame sent by the second device. Therefore, the channel reservation frame may be further used for indicating that all other devices that receive the channel reservation frame except the first device cannot use, within the time period specified by the channel reservation frame, the channel to actively initiate data transmission.

302: The second device determines the sending moment according to the first indication frame, and sending the channel reservation frame at the sending moment.

In the channel reservation method in this embodiment of the present invention, a sender device in a data transmission process indicates a moment at which a receiver device sends a channel reservation frame, so that multiple receiver devices in the data transmission process send channel reservation frames at the same time. In this case, after the sender device receives the channel reservation frame, it is considered that current channel reservation is successful, and a transmission opportunity is obtained. The receiver devices send the channel reservation frame, to contend for a channel, and the sender device does not need to send an additional frame responding to the channel reservation frame, which not only resolves a problem about a hidden node, but also avoids contention between the receiver devices in current data transmission, thereby reducing a collision probability, and reducing system overheads.

In addition, when transmission protection is performed according to the channel reservation method in this embodiment of the present invention, the channel reservation method is not limited by an application scenario, for example, a contention working mode, a scheduling mode, or a mode in which contention and scheduling are integrated. Therefore, this embodiment of the present invention has a wider application scope.

It should be understood that, the first device is a sender in the data transmission process, and the second device is the receiver in the data transmission process. In an application scenario of an unscheduled mode, for example, in a contention mode, the second device may determine that the second device is the receiver in the data transmission process when receiving the first indication frame or by receiving another information frame sent by the first device. Alternatively, in an application scenario into which the scheduling mode is introduced, the second device may determine, after acquiring scheduling information, that the second device is the receiver of the data in a corresponding timeslot on the corresponding channel, so that a receiver in a data transmission process can send a channel reservation frame, thereby resolving a problem about a hidden node.

For example, when multiple BSSs (Basic Service Set) based on the scheduling mode coexist, APs of the multiple BSSs may contend for a channel by using a method of controlling STAs to send channel reservation frames. An AP of each BSS may instruct a scheduled STA to send, on a scheduled channel, a channel reservation frame according to a random backoff time generated by the AP. All STAs on a same channel in a same BSS send channel reservation frames at the same time, and contend with other BSSs for a channel, which not only avoids contention between the STAs in this BSS, but also reduces a collision probability.

For another example, the second devices uniformly send channel reservation frames by means of OFDM (Orthogonal Frequency Division Multiplexing). Physical layer data, physical layer parameters, and encoding manners of the channel reservation frames are completely the same, so as to ensure that the first device can correctly receive the channel reservation frames that are sent by the multiple second devices at the same time, and therefore, obtain a transmission opportunity. Using a CTS-to-self frame as an example, to ensure that CTS-to-self frames sent by all the STAs are identical, structures of the CTS-to-self frames need to be modified, where RA (Receiver Address) domains in the CTS-to-self frames no longer indicate address information of the CTS-to-self frames, but indicate a same address, for example, an address of the AP, or a network address preset by multiple coordinated BSSs.

Optionally, as an embodiment, the first indication frame includes a random backoff time, and in step 302, when determining the sending moment according to the first indication frame, the second device may perform random backoff according to the random backoff time in the first indication frame. If the channel is idle within the random backoff time, the second device determines that a moment at which the random backoff time expires is the sending moment.

For example, the first device generates a random number as the random backoff time, and sends the random backoff time to the second device by using the first indication frame. The second device performs random backoff within the random backoff time, and performs channel sensing. If the channel is idle, the second device sends the channel reservation frame at the moment at which the random backoff time expires; otherwise, the channel reservation frame is not sent.

Optionally, as another embodiment, the first indication frame includes a channel reservation frame sending rule, in step 302, when determining the sending moment according to the first indication frame, the second device may determine the sending moment according to the channel reservation frame sending rule in the first indication frame.

For example, the channel reservation frame sending rule may be: a working mode is set, and a sending moment of the channel reservation frame in such a working mode is predefined; or an AP in a scheduling system may specify that: when each timeslot ends, stations to be scheduled to a next timeslot send the channel reservation frame on a scheduled channel at the same time. If multiple STAs comply with the rule specified by the AP, the multiple STAs may send channel reservation frames at the same time. For example, all STAs in a scheduling system that are scheduled to a same channel and a same timeslot may send, on the scheduled channel, channel reservation frames at the same time.

Optionally, as another embodiment, when the channel reservation frame is sent at the sending moment, the channel reservation frame may be sent at the sending moment in a broadcast manner.

Optionally, in some application scenarios, for example, in an exclusive area such as a corporate campus, performance of a network deployed by a corporation may need to be ensured, and a network device that is not deployed by the corporation is blocked for this purpose. In this case, some dedicated channel reservation devices may be deployed in the corporate campus, and an AP may instruct these devices to send channel reservation frames, to reserve channels for the network device that is not deployed by the corporation. If a device in a WLAN network deployed by the corporation receives the channel reservation frames sent by these channel reservation devices, a setting of a NAV is not modified. In this way, the network device that is not deployed by the corporation does not affect communication in the network of the corporation.

Optionally, coordinated stations (including an AP and a STA), for example, an AP and all STAs in a BSS based on scheduling transmission, or all APs and a STA in multiple BSSs that may perform joint scheduling, do not contend for a channel by means of contention. If receiving a channel reservation frame sent by another coordinated station, any one of the coordinated stations neither needs to keep silent nor needs to modify a setting of a NAV.

Specifically, whether a channel reservation frame is from a coordinated station may be determined by using the following method: each station saves addresses of APs in all coordinated BSSs or a network address of multiple coordinated BSSs. If a receiver address domain (for example, an RA domain in CTS-to-self frames) in the channel reservation frame is one of a list of coordinated APs, or is the network address of the multiple coordinated BSSs, it may be determined that the channel reservation frame is from the coordinated station.

FIG. 4 is a schematic flowchart of a channel reservation method 40 according to another embodiment of the present invention. A first device executing the method 40 of FIG. 4 is a sender in a data transmission process, for example, an AP 110 or a STA 120 shown in FIG. 1.

401: The first device generates a second indication frame, where the second indication frame is used for instructing a second device to send a channel reservation frame, and the channel reservation frame is used for reserving a channel to be used when the first device sends data to the second device.

402: The first device sends the second indication frame to the second device.

In the channel reservation method in this embodiment of the present invention, a sender device in a data transmission process instructs a receiver device to send a channel reservation frame, and after the sender device receives the channel reservation frame, it is considered that current channel reservation is successful, and a transmission opportunity is obtained. The receiver devices send the channel reservation frame, to contend for a channel, and the sender device does not need to send an additional frame responding to the channel reservation frame, which provides an implementable manner to resolve a problem about a hidden node.

In addition, when transmission protection is performed according to the channel reservation method in this embodiment of the present invention, the channel reservation method is not limited by an application scenario, for example, a contention working mode, a scheduling mode, or a mode in which contention and scheduling are integrated. Therefore, this embodiment of the present invention has a wider application scope.

It should be understood that, the first device is the sender in the data transmission process, and the second device is a receiver in the data transmission process. The second device may send the channel reservation frame when receiving the second indication frame; therefore, a receiver in a data transmission process can send a channel reservation frame, thereby resolving a problem about a hidden node.

Optionally, as an embodiment, in step 402, when the first device sends the second indication frame to the second device, the first device may first perform random backoff, and then the first device sends the second indication frame to the second device when the channel is idle. In this way, a collision probability can be further reduced, so that system overheads are reduced.

FIG. 5 is a schematic flowchart of a channel reservation method 50 according to another embodiment of the present invention. A second device executing the method 50 of FIG. 5 is a receiver in a data transmission process, for example, an AP 110 or a STA 120 shown in FIG. 1.

501: The second device receives a second indication frame from a first device, where the second indication frame is used for instructing the second device to send a channel reservation frame, and the channel reservation frame is used for reserving a channel to be used when the first device sends data to the second device.

502: The second device sends the channel reservation frame.

In the channel reservation method in this embodiment of the present invention, a sender device in a data transmission process instructs a receiver device to send a channel reservation frame, and after the sender device receives the channel reservation frame, it is considered that current channel reservation is successful, and a transmission opportunity is obtained. The receiver devices send the channel reservation frame, to contend for a channel, and the sender device does not need to send an additional frame responding to the channel reservation frame, which provides an implementable manner to resolve a problem about a hidden node.

In addition, when transmission protection is performed according to the channel reservation method in this embodiment of the present invention, the channel reservation method is not limited by an application scenario, for example, a contention working mode, a scheduling mode, or a mode in which contention and scheduling are integrated. Therefore, this embodiment of the present invention has a wider application scope.

It should be understood that, the first device is a sender in the data transmission process, and the second device is the receiver in the data transmission process. The second device may send the channel reservation frame when receiving the second indication frame; therefore, a receiver in a data transmission process can send a channel reservation frame, thereby resolving a problem about a hidden node.

Optionally, as an embodiment, in step 502, when the second device sends the channel reservation frame, the second device may first perform random backoff, and if the channel is idle, the second device then sends the channel reservation frame.

FIG. 6 is a schematic block diagram of a communications device 60 according to an embodiment of the present invention. The communications device 60 in FIG. 6 includes a generation unit 610 and a sending unit 620. For example, the communications device 60 may be an AP 110 shown in FIG. 1.

The generation unit 610 is configured to generate a first indication frame, where the first indication frame is used for indicating a moment at which a second device sends a channel reservation frame, and the channel reservation frame is used for reserving a channel to be used when the communications device 60 sends data to the second device.

The sending unit 620 is configured to send the first indication frame to multiple second devices.

In a channel reservation method in this embodiment of the present invention, a sender device in a data transmission process indicates a moment at which a receiver device sends a channel reservation frame, so that multiple receiver devices in the data transmission process send channel reservation frames at the same time. In this case, after the sender device receives the channel reservation frame, it is considered that current channel reservation is successful, and a transmission opportunity is obtained. The receiver devices send the channel reservation frame, to contend for a channel, and the sender device does not need to send an additional frame responding to the channel reservation frame, which not only resolves a problem about a hidden node, but also avoids contention between the receiver devices in current data transmission, thereby reducing a collision probability, and reducing system overheads.

In addition, when transmission protection is performed according to this embodiment of the present invention, the channel reservation method is not limited by an application scenario, for example, a contention working mode, a scheduling mode, or a mode in which contention and scheduling are integrated. Therefore, this embodiment of the present invention has a wider application scope.

It should be understood that, the communications device 60 is a sender in a data transmission process, and the second device is a receiver in the data transmission process. In an application scenario of an unscheduled mode, for example, in a contention mode, the second device may determine that the second device is the receiver in the data transmission process when receiving the first indication frame or by receiving another information frame sent by the communications device 60. Alternatively, in an application scenario into which the scheduling mode is introduced, the second device may determine, after acquiring scheduling information, that the second device is the receiver of the data in a corresponding timeslot on the corresponding channel, so that a receiver in a data transmission process can send a channel reservation frame, thereby resolving a problem about a hidden node.

For example, when multiple BSSs (Basic Service Set) based on the scheduling mode coexist, APs of the multiple BSSs may contend for a channel by using a method of controlling STAs to send channel reservation frames. An AP of each BSS may instruct a scheduled STA to send, on a scheduled channel, a channel reservation frame according to a random backoff time generated by the AP. All STAs on a same channel in a same BSS send channel reservation frames at the same time, and contend with other BSSs for a channel, which not only avoids contention between the STAs in this BSS, but also reduces a collision probability.

For another example, the second devices uniformly send channel reservation frames by means of OFDM (Orthogonal Frequency Division Multiplexing). Physical layer data, physical layer parameters, and encoding manners of the channel reservation frames are completely the same, so as to ensure that the communications device can correctly receive the channel reservation frames that are sent by the multiple second devices at the same time, and therefore, obtain a transmission opportunity. Using a CTS-to-self frame as an example, to ensure that CTS-to-self frames sent by all the STAs are identical, structures of the CTS-to-self frames need to be modified, where RA (Receiver Address, receiver address) domains in the CTS-to-self frames no longer indicate address information of the CTS-to-self frames, but indicate a same address, for example, an address of the AP, or a network address preset by multiple coordinated BSSs.

Optionally, as an embodiment, the sending unit 620 is specifically configured to send the first indication frame to the multiple second devices in a broadcast or multicast manner.

Optionally, as another embodiment, the communications device 60 further includes an acquiring unit 630. The acquiring unit 630 is configured to acquire scheduling information. In this case, the sending unit 620 is specifically configured to send the first indication frame to the multiple second devices according to the scheduling information.

FIG. 7 is a schematic block diagram of a communications device 70 according to another embodiment of the present invention. The communications device 70 in FIG. 7 includes a receiving unit 710, a determining unit 720, and a sending unit 730. For example, the communications device 70 may be a STA 120 shown in FIG. 1.

The receiving unit 710 is configured to receive a first indication frame from a first device, where the first indication frame is used for indicating a sending moment at which the communications device sends a channel reservation frame, and the channel reservation frame is used for reserving a channel to be used when the first device sends data to the communications device.

The determining unit 720 is configured to determine the sending moment according to the first indication frame.

The sending unit 730 is configured to send the channel reservation frame at the sending moment.

In a channel reservation method in this embodiment of the present invention, a sender device in a data transmission process indicates a moment at which a receiver device sends a channel reservation frame, so that multiple receiver devices in the data transmission process send channel reservation frames at the same time. In this case, after the sender device receives the channel reservation frame, it is considered that current channel reservation is successful, and a transmission opportunity is obtained. The receiver devices send the channel reservation frame, to contend for a channel, and the sender device does not need to send an additional frame responding to the channel reservation frame, which not only resolves a problem about a hidden node, but also avoids contention between the receiver devices in current data transmission, thereby reducing a collision probability, and reducing system overheads.

In addition, when transmission protection is performed according to this embodiment of the present invention, the channel reservation method is not limited by an application scenario, for example, a contention working mode, a scheduling mode, or a mode in which contention and scheduling are integrated. Therefore, this embodiment of the present invention has a wider application scope.

It should be understood that, the first device is a sender in a data transmission process, and the communications device 70 is a receiver in the data transmission process. In an application scenario of an unscheduled mode, for example, in a contention mode, the communications device 70 may determine that the communications device 70 is the receiver in the data transmission process when receiving the first indication frame or by receiving another information frame sent by the first device. Alternatively, in an application scenario into which the scheduling mode is introduced, the communications device 70 may determine, after acquiring scheduling information, that the communications device 70 is the receiver of the data in a corresponding timeslot on the corresponding channel, so that a receiver in a data transmission process can send a channel reservation frame, thereby resolving a problem about a hidden node.

For example, when multiple BSSs (Basic Service Set, basic service set) based on the scheduling mode coexist, APs of the multiple BSSs may contend for a channel by using a method of controlling STAs to send channel reservation frames. An AP of each BSS may instruct a scheduled STA to send, on a scheduled channel, a channel reservation frame according to a random backoff time generated by the AP. All STAs on a same channel in a same BSS send channel reservation frames at the same time, and contend with other BSSs for a channel, which not only avoids contention between the STAs in this BSS, but also reduces a collision probability.

For another example, communications devices uniformly send channel reservation frames by means of OFDM (Orthogonal Frequency Division Multiplexing). Physical layer data, physical layer parameters, and encoding manners of the channel reservation frames are completely the same, so as to ensure that the first device can correctly receive the channel reservation frames that are sent by the multiple communications devices at the same time, and therefore, obtain a transmission opportunity. Using a CTS-to-self frame as an example, to ensure that CTS-to-self frames sent by all the STAs are identical, structures of the CTS-to-self frames need to be modified, where RA (Receiver Address) domains in the CTS-to-self frames no longer indicate address information of the CTS-to-self frames, but indicate a same address, for example, an address of the AP, or a network address preset by multiple coordinated BSSs.

Optionally, as an embodiment, the first indication frame includes a random backoff time, and the communications device 70 further includes a control unit 740. The control unit 740 is configured to control, according to the random backoff time in the first indication frame, the communications device to perform random backoff. In this case, the determining unit 720 is specifically configured to: if the channel is idle within the random backoff time, determine that a moment at which the random backoff time expires is the sending moment.

Optionally, as another embodiment, the first indication frame includes a channel reservation frame sending rule. In this case, the determining unit 720 is specifically configured to determine the sending moment according to the channel reservation frame sending rule in the first indication frame.

Optionally, as another embodiment, the sending unit 730 is specifically configured to send the channel reservation frame at the sending moment in a broadcast manner.

Figure 8:
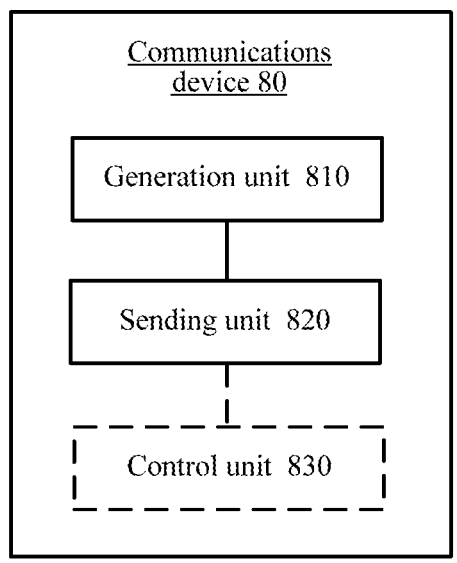
FIG. 8 is a schematic block diagram of a communications device according to another embodiment of the present invention.

FIG. 8 is a schematic block diagram of a communications device 80 according to another embodiment of the present invention. The communications device 80 in FIG. 8 includes a generation unit 810 and a sending unit 820. For example, the communications device 80 may be an AP 110 or a STA 120 shown in FIG. 1.

The generation unit 810 is configured to generate a second indication frame, where the second indication frame is used for instructing a second device to send a channel reservation frame, and the channel reservation frame is used for reserving a channel to be used when the communications device 80 sends data to the second device.

The sending unit 820 is configured to send the second indication frame to the second device.

In a channel reservation method in this embodiment of the present invention, a sender device in a data transmission process instructs a receiver device to send a channel reservation frame, and after the sender device receives the channel reservation frame, it is considered that current channel reservation is successful, and a transmission opportunity is obtained. The receiver devices send the channel reservation frame, to contend for a channel, and the sender device does not need to send an additional frame responding to the channel reservation frame, which not only resolves a problem about a hidden node, but also reduces additional system overheads.

In addition, when transmission protection is performed according to the channel reservation method in this embodiment of the present invention, the channel reservation method is not limited by an application scenario, for example, a contention working mode, a scheduling mode, or a mode in which contention and scheduling are integrated. Therefore, this embodiment of the present invention has a wider application scope.

It should be understood that, the communications device 80 is a sender in a data transmission process, and the second device is a receiver in the data transmission process. The second device may send the channel reservation frame when receiving the second indication frame; therefore, a receiver in a data transmission process can send a channel reservation frame, thereby resolving a problem about a hidden node.

Optionally, as an embodiment, the communications device 80 further includes a control unit 830. The control unit 830 is configured to control the communications device to perform random backoff. In this case, the sending unit 820 is specifically configured to send the second indication frame to the second device when the channel is idle. In this way, a collision probability can be further reduced, so that system overheads are reduced.

Figure 9:
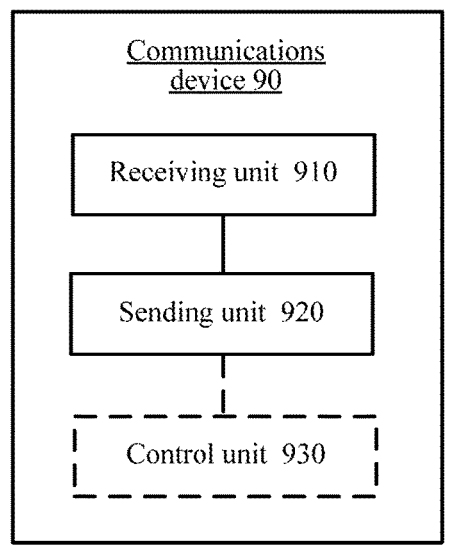
FIG. 9 is a schematic block diagram of a communications device according to another embodiment of the present invention.

FIG. 9 is a schematic block diagram of a communications device 90 according to another embodiment of the present invention. The communications device 90 in FIG. 9 includes a receiving unit 910 and a sending unit 920. For example, the communications device 90 may be an AP 110 or a STA 120 shown in FIG. 1.

The receiving unit 910 is configured to receive a second indication frame from a first device, where the second indication frame is used for instructing the communications device to send a channel reservation frame, and the channel reservation frame is used for reserving a channel to be used when the first device sends data to the communications device.

The sending unit 920 is configured to send the channel reservation frame.

In a channel reservation method in this embodiment of the present invention, a sender device in a data transmission process instructs a receiver device to send a channel reservation frame, and after the sender device receives the channel reservation frame, it is considered that current channel reservation is successful, and a transmission opportunity is obtained. The receiver devices send the channel reservation frame, to contend for a channel, and the sender device does not need to send an additional frame responding to the channel reservation frame, which not only resolves a problem about a hidden node, but also reduces additional system overheads.

In addition, when transmission protection is performed according to the channel reservation method in this embodiment of the present invention, the channel reservation method is not limited by an application scenario, for example, a contention working mode, a scheduling mode, or a mode in which contention and scheduling are integrated. Therefore, this embodiment of the present invention has a wider application scope.

It should be understood that, the first device is a sender in a data transmission process, and the communications device 90 is a receiver in the data transmission process. The communications device 90 may send the channel reservation frame when receiving the second indication frame; therefore, a receiver in a data transmission process can send a channel reservation frame, thereby resolving a problem about a hidden node.

Optionally, as an embodiment, the communications device 90 further includes a control unit 930. The control unit 930 is configured to control the communications device to perform random backoff. In this case, the sending unit 920 is specifically configured to: if the channel is idle, send the channel reservation frame. In this way, a collision probability can be further reduced, so that system overheads are reduced.

Figure 10:
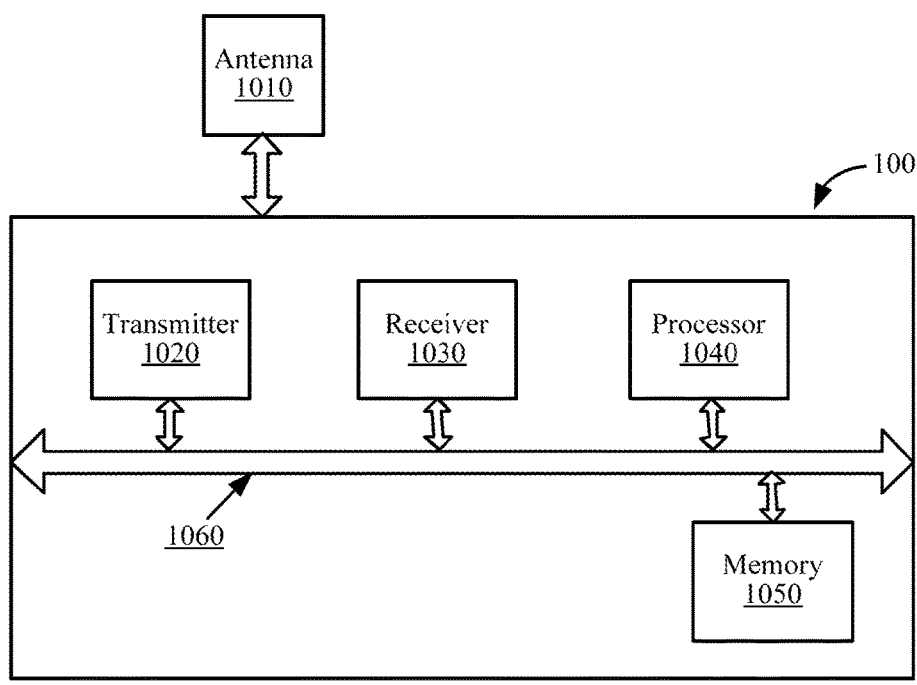
FIG. 10 is a schematic block diagram of a communications device according to another embodiment of the present invention.

FIG. 10 is a schematic block diagram of a communications device 100 according to another embodiment of the present invention.

The communications device 100 in FIG. 10 may be configured to implement steps and methods in the foregoing method embodiments. In the embodiment of FIG. 10, the communications device 100 includes an antenna 1010, a transmitter 1020, a receiver 1030, a processor 1040, and a memory 1050. The processor 1040 controls an operation of the communications device 100, and may be configured to process a signal. The memory 1050 may include a read-only memory and a random access memory, and provide an instruction and data to the processor 1040. The transmitter 1020 and the receiver 1030 may be coupled to the antenna 1010. Components of the communications device 100 are coupled together by using a bus system 1060, where the bus system 1060 includes not only a data bus, but also a power bus, a control bus, and a status signal bus. However, for a clear description, various buses are marked as the bus system 1060 in the figure. The communications device 100 is a sender in a data transmission process, for example, may be an AP 110 shown in FIG. 1.

Specifically, the memory 1050 may store an instruction for executing the following process: the processor 1040 generates a first indication frame, where the first indication frame is used for indicating a moment at which a second device sends a channel reservation frame, and the channel reservation frame is used for reserving a channel to be used when the communications device sends data to the second device; and the transmitter 1020 sends the first indication frame to multiple second devices.

In a channel reservation method in this embodiment of the present invention, a sender device in a data transmission process indicates a moment at which a receiver device sends a channel reservation frame, so that multiple receiver devices in the data transmission process send channel reservation frames at the same time. In this case, after the sender device receives the channel reservation frame, it is considered that current channel reservation is successful, and a transmission opportunity is obtained. The receiver devices send the channel reservation frame, to contend for a channel, and the sender device does not need to send an additional frame responding to the channel reservation frame, which not only resolves a problem about a hidden node, but also avoids contention between the receiver devices in current data transmission, thereby reducing a collision probability, and reducing system overheads.

In addition, when transmission protection is performed according to this embodiment of the present invention, the channel reservation method is not limited by an application scenario, for example, a contention working mode, a scheduling mode, or a mode in which contention and scheduling are integrated. Therefore, this embodiment of the present invention has a wider application scope.

It should be understood that, the communications device is the sender in the data transmission process, and the second device is a receiver in the data transmission process. In an application scenario of an unscheduled mode, for example, in a contention mode, the second device may determine that the second device is the receiver in the data transmission process when receiving the first indication frame or by receiving another information frame sent by the communications device. Alternatively, in an application scenario into which the scheduling mode is introduced, the second device may determine, after acquiring scheduling information, that the second device is the receiver of the data in a corresponding timeslot on the corresponding channel, so that a receiver in a data transmission process can send a channel reservation frame, thereby resolving a problem about a hidden node.

For example, when multiple BSSs (Basic Service Set) based on the scheduling mode coexist, APs of the multiple BSSs may contend for a channel by using a method of controlling STAs to send channel reservation frames. An AP of each BSS may instruct a scheduled STA to send, on a scheduled channel, a channel reservation frame according to a random backoff time generated by the AP. All STAs on a same channel in a same BSS send channel reservation frames at the same time, and contend with other BSSs for a channel, which not only avoids contention between the STAs in this BSS, but also reduces a collision probability.

For another example, the second devices uniformly send channel reservation frames by means of OFDM (Orthogonal Frequency Division Multiplexing). Physical layer data, physical layer parameters, and encoding manners of the channel reservation frames are completely the same, so as to ensure that the communications device can correctly receive the channel reservation frames that are sent by the multiple second devices at the same time, and therefore, obtain a transmission opportunity. Using a CTS-to-self frame as an example, to ensure that CTS-to-self frames sent by all the STAs are identical, structures of the CTS-to-self frames need to be modified, where RA (Receiver Address) domains in the CTS-to-self frames no longer indicate address information of the CTS-to-self frames, but indicate a same address, for example, an address of the AP, or a network address preset by multiple coordinated BSSs.

Optionally, as an embodiment, the memory 1050 may further store an instruction for executing the following process: when sending the first indication frame to the multiple second devices, the transmitter 1020 may send the first indication frame to the multiple second devices in a broadcast or multicast manner.

Optionally, as an embodiment, the memory 1050 may further store an instruction for executing the following process: before the first indication frame is generated, the processor 1040 acquires scheduling information; in this case, the transmitter 1020 sends the first indication frame to the multiple second devices according to the scheduling information.

Figure 11:
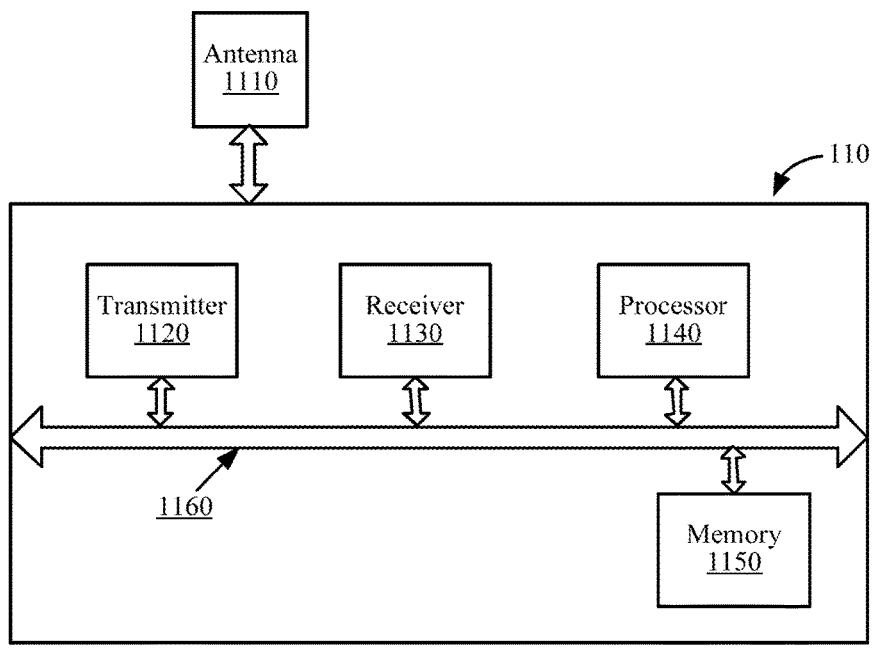
FIG. 11 is a schematic block diagram of a communications device according to another embodiment of the present invention.

FIG. 11 is a schematic block diagram of a communications device according to another embodiment of the present invention.

A communications device 110 in FIG. 11 may be configured to implement steps and methods in the foregoing method embodiments. In the embodiment of FIG. 11, the communications device 110 includes an antenna 1110, a transmitter 1120, a receiver 1130, a processor 1140, and a memory 1150. The processor 1140 controls an operation of the communications device 110, and may be configured to process a signal. The memory 1150 may include a read-only memory and a random access memory, and provide an instruction and data to the processor 1140. The transmitter 1120 and the receiver 1130 may be coupled to the antenna 1110. Components of the communications device 110 are coupled together by using a bus system 1160, where the bus system 1160 includes not only a data bus, but also a power bus, a control bus, and a status signal bus. However, for a clear description, various buses are marked as the bus system 1160 in the figure. The communications device 110 is a receiver in a data transmission process, for example, may be a STA 120 shown in FIG. 1.

Specifically, the memory 1150 may store an instruction for executing the following process: the receiver 1130 receives a first indication frame from a first device, where the first indication frame is used for indicating a sending moment at which the communications device 110 sends a channel reservation frame, and the channel reservation frame is used for reserving a channel to be used when the communications device 110 sends data to the first device; the processor 1140 determines the sending moment according to the first indication frame; and the transmitter 1120 sends the channel reservation frame at the sending moment.

In a channel reservation method in this embodiment of the present invention, a sender device in a data transmission process indicates a moment at which a receiver device sends a channel reservation frame, so that multiple receiver devices in the data transmission process send channel reservation frames at the same time. In this case, after the sender device receives the channel reservation frame, it is considered that current channel reservation is successful, and a transmission opportunity is obtained. The receiver devices send the channel reservation frame, to contend for a channel, and the sender device does not need to send an additional frame responding to the channel reservation frame, which not only resolves a problem about a hidden node, but also avoids contention between the receiver devices in current data transmission, thereby reducing a collision probability, and reducing system overheads.

In addition, when transmission protection is performed according to this embodiment of the present invention, the channel reservation method is not limited by an application scenario, for example, a contention working mode, a scheduling mode, or a mode in which contention and scheduling are integrated. Therefore, this embodiment of the present invention has a wider application scope.

It should be understood that, the first device is a sender in the data transmission process, and the communications device is the receiver in the data transmission process. In an application scenario of an unscheduled mode, for example, in a contention mode, the communications device may determine that the communications device is the receiver in the data transmission process when receiving the first indication frame or by receiving another information frame sent by the first device. Alternatively, in an application scenario into which the scheduling mode is introduced, the communications device may determine, after acquiring scheduling information, that the communications device is the receiver of the data in a corresponding timeslot on the corresponding channel, so that a receiver in a data transmission process can send a channel reservation frame, thereby resolving a problem about a hidden node.

For example, when multiple BSSs (Basic Service Set, basic service set) based on the scheduling mode coexist, APs of the multiple BSSs may contend for a channel by using a method of controlling STAs to send channel reservation frames. An AP of each BSS may instruct a scheduled STA to send, on a scheduled channel, a channel reservation frame according to a random backoff time generated by the AP. All STAs on a same channel in a same BSS send channel reservation frames at the same time, and contend with other BSSs for a channel, which not only avoids contention between the STAs in this BSS, but also reduces a collision probability.

For another example, communications devices uniformly send channel reservation frames by means of OFDM (Orthogonal Frequency Division Multiplexing, orthogonal frequency division multiplexing). Physical layer data, physical layer parameters, and encoding manners of the channel reservation frames are completely the same, so as to ensure that the first device can correctly receive the channel reservation frames that are sent by the multiple communications devices at the same time, and therefore, obtain a transmission opportunity. Using a CTS-to-self frame as an example, to ensure that CTS-to-self frames sent by all the STAs are identical, structures of the CTS-to-self frames need to be modified, where RA (Receiver Address, receiver address) domains in the CTS-to-self frames no longer indicate address information of the CTS-to-self frames, but indicate a same address, for example, an address of the AP, or a network address preset by multiple coordinated BSSs.

Optionally, as an embodiment, the memory 1150 may further store an instruction for executing the following process: the first indication frame includes a random backoff time; in this case, when determining the sending moment according to the first indication frame, the processor 1140 may first control the communications device 110 to perform random backoff according to the random backoff time in the first indication frame; and if the channel is idle within the random backoff time, the processor 1140 then determines that a moment at which the random backoff time expires is the sending moment.

Optionally, as an embodiment, the memory 1150 may further store an instruction for executing the following process: the first indication frame includes a channel reservation frame sending rule; in this case, when determining the sending moment according to the first indication frame, the processor 1140 may determine the sending moment according to the channel reservation frame sending rule in the first indication frame.

Optionally, as an embodiment, the memory 1150 may further store an instruction for executing the following process: when sending the channel reservation frame at the sending moment, the transmitter 1120 sends the channel reservation frame at the sending moment in a broadcast manner.

Figure 12:
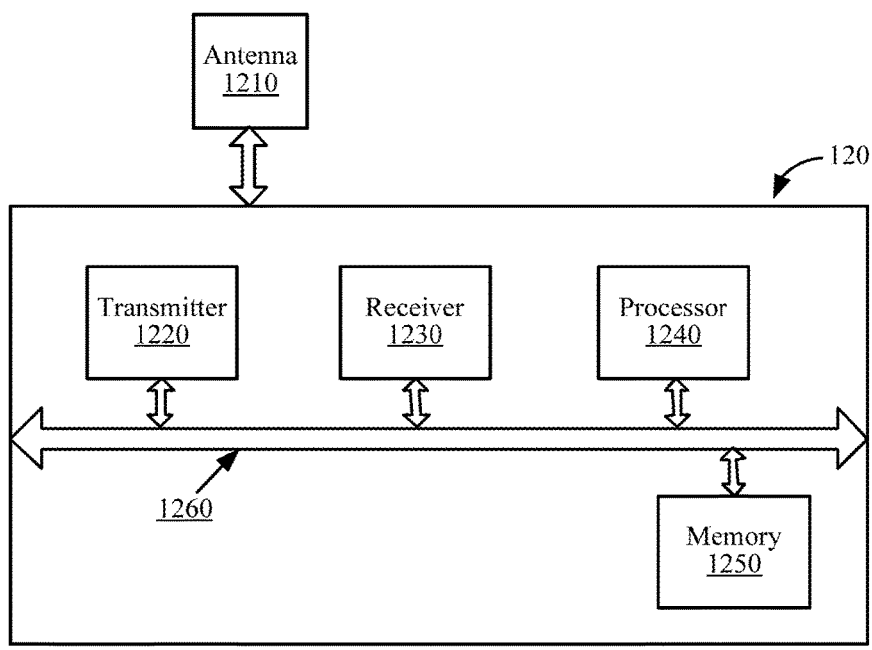
FIG. 12 is a schematic block diagram of a communications device according to another embodiment of the present invention.

FIG. 12 is a schematic block diagram of a communications device according to another embodiment of the present invention.

A communications device 120 in FIG. 12 may be configured to implement steps and methods in the foregoing method embodiments. In the embodiment of FIG. 12, the communications device 120 includes an antenna 1210, a transmitter 1220, a receiver 1230, a processor 1240, and a memory 1250. The processor 1240 controls an operation of the communications device 120, and may be configured to process a signal. The memory 1250 may include a read-only memory and a random access memory, and provide an instruction and data to the processor 1240. The transmitter 1220 and the receiver 1230 may be coupled to the antenna 1210. Components of the communications device 120 are coupled together by using a bus system 1260, where the bus system 1260 includes not only a data bus, but also a power bus, a control bus, and a status signal bus. However, for a clear description, various buses are marked as the bus system 1260 in the figure. The communications device 120 is a sender in a data transmission process, for example, may be an AP 110 or a STA 120 shown in FIG. 1.

Specifically, the memory 1250 may store an instruction for executing the following process: the processor 1240 generates a second indication frame, where the second indication frame is used for instructing a second device to send a channel reservation frame, and the channel reservation frame is used for reserving a channel to be used when the communications device sends data to the second device; and the transmitter 1220 sends the second indication frame to the second device.

In a channel reservation method in this embodiment of the present invention, a sender device in a data transmission process instructs a receiver device to send a channel reservation frame, and after the sender device receives the channel reservation frame, it is considered that current channel reservation is successful, and a transmission opportunity is obtained. The receiver devices send the channel reservation frame, to contend for a channel, and the sender device does not need to send an additional frame responding to the channel reservation frame, which provides an implementable manner to resolve a problem about a hidden node.

In addition, when transmission protection is performed according to the channel reservation method in this embodiment of the present invention, the channel reservation method is not limited by an application scenario, for example, a contention working mode, a scheduling mode, or a mode in which contention and scheduling are integrated. Therefore, this embodiment of the present invention has a wider application scope.

It should be understood that, the communications device is the sender in the data transmission process, and the second device is a receiver in the data transmission process. The second device may send the channel reservation frame when receiving the second indication frame; therefore, a receiver in a data transmission process can send a channel reservation frame, thereby resolving a problem about a hidden node.

Optionally, as an embodiment, the memory 1250 may further store an instruction for executing the following process: when the transmitter 1220 sends the second indication frame to the second device, the processor 1240 may first control the communications device to perform random backoff; and then the transmitter 1220 sends the second indication frame to the second device when the channel is idle.

In this way, a collision probability can be further reduced, so that system overheads are reduced.

Figure 13:
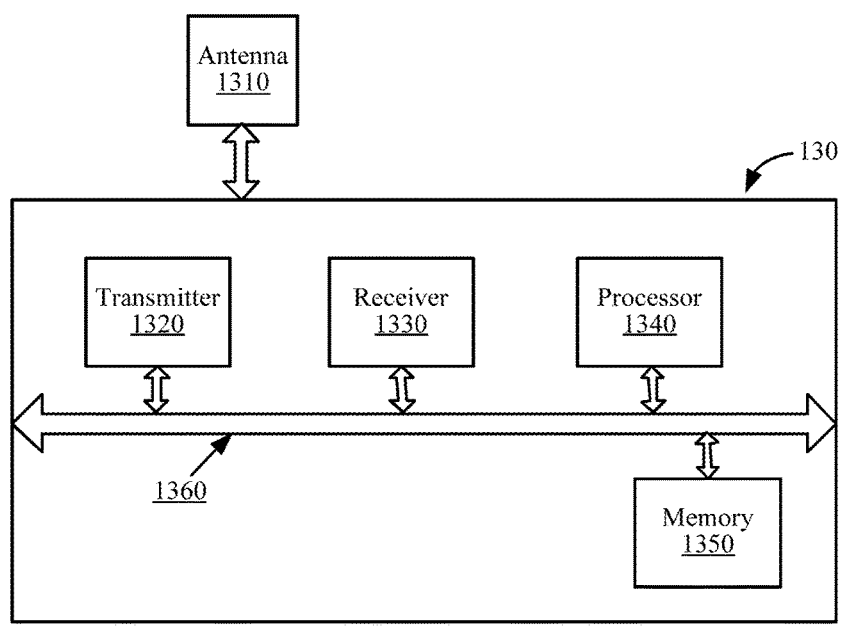
FIG. 13 is a schematic block diagram of a communications device according to another embodiment of the present invention.

FIG. 13 is a schematic block diagram of a communications device according to another embodiment of the present invention.

A communications device 130 in FIG. 13 may be configured to implement steps and methods in the foregoing method embodiments. In the embodiment of FIG. 13, the communications device 130 includes an antenna 1310, a transmitter 1320, a receiver 1330, a processor 1340, and a memory 1350. The processor 1340 controls an operation of the communications device 130, and may be configured to process a signal. The memory 1350 may include a read-only memory and a random access memory, and provide an instruction and data to the processor 1340. The transmitter 1320 and the receiver 1330 may be coupled to the antenna 1310. Components of the communications device 130 are coupled together by using a bus system 1360, where the bus system 1360 includes not only a data bus, but also a power bus, a control bus, and a status signal bus. However, for a clear description, various buses are marked as the bus system 1360 in the figure. The communications device 130 is a receiver in a data transmission process, for example, may be an AP 110 or a STA 120 shown in FIG. 1.

Specifically, the memory 1350 may store an instruction for executing the following process: the receiver 1330 receives a second indication frame from a first device, where the second indication frame is used for instructing the communications device to send a channel reservation frame, and the channel reservation frame is used for reserving a channel to be used when the first device sends data to the communications device; and the transmitter 1320 sends the channel reservation frame.

In a channel reservation method in this embodiment of the present invention, a sender device in a data transmission process instructs a receiver device to send a channel reservation frame, and after the sender device receives the channel reservation frame, it is considered that current channel reservation is successful, and a transmission opportunity is obtained. The receiver devices send the channel reservation frame, to contend for a channel, and the sender device does not need to send an additional frame responding to the channel reservation frame, which provides an implementable manner to resolve a problem about a hidden node.

In addition, when transmission protection is performed according to the channel reservation method in this embodiment of the present invention, the channel reservation method is not limited by an application scenario, for example, a contention working mode, a scheduling mode, or a mode in which contention and scheduling are integrated. Therefore, this embodiment of the present invention has a wider application scope.

It should be understood that, the first device is a sender in the data transmission process, and the communications device is the receiver in the data transmission process. The communications device may send the channel reservation frame when receiving the second indication frame; therefore, a receiver in a data transmission process can send a channel reservation frame, thereby resolving a problem about a hidden node.

Optionally, as an embodiment, the memory 1350 may further store an instruction for executing the following process when the transmitter 1320 sends the channel reservation frame, the processor 1340 may first control the communications device to perform random backoff; and if the channel is idle, the transmitter 1320 then sends the channel reservation frame.

It should be understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments of the present invention.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The software product is stored in a storage medium and includes several instructions for instructing a computer device (which may be a personal computer, a server, a network device, or the like) to perform all or some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific embodiments of the present invention, but are not intended to limit the protection scope of the present invention. Any modification or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method comprising:
   generating, by a first device, a first indication frame, wherein the first indication frame indicates a moment at which each device of a plurality of second devices simultaneously sends a channel reservation frame, and wherein the channel reservation frame reserves a channel to be used when the first device sends data to a second device of the plurality of second devices;
   sending, by the first device, the first indication frame to the plurality of second devices;
   receiving, by the first device, a first channel reservation frame from each device of the plurality of second devices, wherein each first channel reservation frame that is received from each device of the plurality of second devices is simultaneously transmitted, by each device of the plurality of second devices, at the moment indicated by the first indication frame: and
   receiving, by the first device, a second channel reservation frame from a third device, wherein, in response to determining that the third device is a coordinated station, receiving the second channel reservation frame does not prevent the first device from sending data to the second device and does not cause the first device to modify a setting of a network allocation vector (NAV), wherein determining that the third device is a coordinated station comprises determining that a receiver address domain in the second channel reservation frame indicates a network address of an access point from a list of coordinated access points.

2. The method according to claim 1, wherein sending, by the first device, the first indication frame to the plurality of second devices comprises:
   sending, by the first device, the first indication frame to the plurality of second devices in a broadcast or multicast manner.

3. The method according to claim 1, further comprising acquiring, by the first device, scheduling information before generating, by the first device, the first indication frame; and
   wherein sending, by the first device, the first indication frame to the plurality of second devices comprises:
      sending, by the first device, the first indication frame to the plurality of second devices according to the scheduling information.

4. A method comprising:
   receiving, by a second device, a first indication frame from a first device, wherein the first indication frame indicates a sending moment at which the second device sends a first channel reservation frame simultaneously with a third device sending a second channel reservation frame, and the first channel reservation frame reserves a channel to be used when the first device sends data to the second device;
   determining, by the second device, the sending moment according to the first indication frame;
   receiving, by the second device, a third channel reservation frame from a fourth device, wherein, in response to determining that the fourth device is a coordinated station, receiving the third channel reservation frame does not prevent the second device from transmitting data and does not cause the second device to modify a setting of a network allocation vector (NAV), wherein determining that the fourth device is a coordinated station comprises determining that a receiver address domain in the third channel reservation frame indicates a network address of an access point from a list of coordinated access points; and
   sending, by the second device, the first channel reservation frame at the sending moment, wherein the second channel reservation frame is simultaneously sent by the third device at the sending moment.

5. The method according to claim 4, wherein the first indication frame comprises a random backoff time, and the determining, by the second device, the sending moment according to the first indication frame comprises:
   performing, by the second device, random backoff according to the random backoff time in the first indication frame; and
   when the channel is idle within the random backoff time, determining, by the second device, that a moment at which the random backoff time expires is the sending moment.

6. The method according to claim 4, wherein the first indication frame comprises a channel reservation frame sending rule, and the determining, by the second device, the sending moment according to the first indication frame comprises:
   determining, by the second device, the sending moment according to the channel reservation frame sending rule in the first indication frame.

7. The method according to claim 4, wherein the sending the first channel reservation frame at the sending moment comprises:
   sending the first channel reservation frame at the sending moment in a broadcast manner.

8. A communications device comprising:
   a processor;
   a non-transitory computer-readable storage medium storing a program to be executed by the processor, the program comprising instructions for:

generating a first indication frame, wherein the first indication frame is used for indicating a moment at which each device of a plurality of second devices sends a channel reservation frame, and wherein the channel reservation frame is used for reserving a channel to be used when the communications device sends data to a second device of the plurality of second devices;

a transmitter configured to send the first indication frame to the plurality of second devices; and a receiver configured to:

receive a first channel reservation frame from each device of the plurality of second devices, wherein each first channel reservation frame that is received from each device of the plurality of second devices is simultaneously transmitted, by each device of the plurality of second devices, at the moment indicated by the first indication frame; and receive a second channel reservation frame from a third device, wherein, in response to determining that the third device is a coordinated station, receiving the second channel reservation frame does not prevent the communications device from sending data to the second device and does not cause the communications device to modify a setting of a network allocation vector (NAV), wherein determining that the third device is a coordinated station comprises determining that a receiver address domain in the second channel reservation frame indicates a network address of an access point from a list of coordinated access points.

9. The communications device according to claim 8, wherein the transmitter is specifically configured to send the first indication frame to the plurality of second devices in a broadcast or multicast manner.

10. The communications device according to claim 8, wherein the program comprises further instructions for acquiring scheduling information; and wherein the transmitter is specifically configured to send the first indication frame to the plurality of second devices according to the scheduling information.

11. A communications device comprising:

a receiver configured to:

receive a first indication frame from a first device, wherein the first indication frame is used for indicating a sending moment at which the communications device sends a first channel reservation frame simultaneously with a third device sending a second channel reservation frame, and wherein the first channel reservation frame is used for reserving a channel to be used when the first device sends data to the communications device; and receive a third channel reservation frame from a fourth device, wherein, in response to determining that the fourth device is a coordinated station, receiving the third channel reservation frame does not prevent the communications device from transmitting data and does not cause the communications device to modify a setting of a network allocation vector (NAV), wherein determining that the fourth device is a coordinated station comprises determining that a receiver address domain in the third channel reservation frame indicates a network address of an access point from a list of coordinated access points;

a processor;

a non-transitory computer-readable storage medium storing a program to be executed by the processor, the program comprising instructions for determining the sending moment according to the first indication frame; and a transmitter configured to send the first channel reservation frame at the sending moment, wherein the second channel reservation frame is simultaneously sent by the third device at the sending moment.

12. The communications device according to claim 11, wherein the first indication frame comprises a random backoff time, wherein the program comprising further instructions to:

control, according to the random backoff time in the first indication frame, the communications device to perform random backoff, and when the channel is idle within the random backoff time, determine that a moment at which the random backoff time expires is the sending moment.

13. The communications device according to claim 11, wherein the first indication frame comprises a channel reservation frame sending rule, and the program comprises further instructions to determine the sending moment according to the channel reservation frame sending rule in the first indication frame.

14. The communications device according to claim 11, wherein the transmitter is specifically configured to send the first channel reservation frame at the sending moment in a broadcast manner.

* * * * *